US010534559B2

(12) United States Patent
Jain et al.

(10) Patent No.: US 10,534,559 B2
(45) Date of Patent: Jan. 14, 2020

(54) HEAT-TIERED STORAGE SYSTEM HAVING HOST AWARENESS

(71) Applicant: INTERNATIONAL BUSINESS MACHINES CORPORATION, Armonk, NY (US)

(72) Inventors: Abhishek Jain, Baraut (IN); Sarvesh Patel, Pune (IN); Subhojit Roy, Pune (IN); Kushal Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/896,295

(22) Filed: Feb. 14, 2018

(65) Prior Publication Data

US 2019/0250819 A1    Aug. 15, 2019

(51) Int. Cl.
*G06F 3/06* (2006.01)
*G06F 16/18* (2019.01)
*G06F 16/185* (2019.01)

(52) U.S. Cl.
CPC .......... *G06F 3/0647* (2013.01); *G06F 3/061* (2013.01); *G06F 3/067* (2013.01); *G06F 3/0685* (2013.01); *G06F 16/185* (2019.01)

(58) Field of Classification Search
CPC ...... G06F 3/061–3/0611; G06F 3/0647; G06F 3/0658; G06F 3/0685; G06F 16/185
See application file for complete search history.

(56) References Cited

U.S. PATENT DOCUMENTS

| 8,315,995 | B1* | 11/2012 | Levy ............... G06F 3/0608 707/694 |
| 9,026,765 | B1 | 5/2015 | Marshak et al. |
| 9,430,368 | B1 | 8/2016 | Derbeko et al. |
| 2011/0270945 | A1* | 11/2011 | Shiga ............... G06F 3/0605 709/213 |
| 2012/0278569 | A1* | 11/2012 | Kawakami ........ G06F 3/0608 711/162 |
| 2013/0145095 | A1 | 6/2013 | McKean et al. |
| 2013/0318391 | A1 | 11/2013 | Kazemi et al. |
| 2015/0127855 | A1 | 5/2015 | Maki et al. |
| 2015/0286413 | A1 | 10/2015 | Olson et al. |
| 2016/0139821 | A1* | 5/2016 | Dolph ............... G06F 3/0611 711/103 |
| 2016/0202933 | A1* | 7/2016 | Alatorre ........... G06F 3/0647 711/154 |
| 2017/0153834 | A1 | 6/2017 | Islam et al. |

* cited by examiner

*Primary Examiner* — Reginald G Bragdon
*Assistant Examiner* — Curtis James Kortman
(74) *Attorney, Agent, or Firm* — Brian F. Russell; Wenjie Li (57) ABSTRACT

A data storage system includes multiple tiers of data storage accessible by multiple hosts. The multiple tiers include an upper tier having a lower access latency and a lower tier having a higher access latency. For each extent among a plurality of extents of file system objects in the data storage, the storage controller separately tracks, for each of one or more hosts that access the extent, a respective heat indicative of a frequency of access by that host. In response to an event disassociating a first host among the multiple hosts from a particular extent among the plurality of extents, the storage controller recalculates an overall heat of the particular extent while excluding a first heat of the first host for the particular extent. The storage controller migrates extents among the multiple tiers based on overall heats of the plurality of extents.

13 Claims, 6 Drawing Sheets

HEAT-TIERED STORAGE SYSTEM HAVING HOST AWARENESS

BACKGROUND OF THE INVENTION

This disclosure relates to data processing and data storage, and more specifically, to intelligent allocation of heat-tiered storage in a multi-host environment.

In general, cloud computing refers to a computational model in which processing, storage, and network resources, software, and data are accessible to remote host systems, where the details of the underlying information technology (IT) infrastructure providing such resources is transparent to consumers of cloud services. Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of cloud computing has been facilitated by the widespread utilization of virtualization, which is the creation of virtual (rather than actual) versions of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different cloud computing customers. The virtualization of actual IT resources and management of VMs is typically provided by software referred to as a VM monitor (VMM) or hypervisor.

In a typical virtualized computing environment, VMs can communicate with each other and with physical entities in the IT infrastructure of the utility computing environment utilizing conventional networking protocols. As is known in the art, conventional networking protocols are commonly premised on the well-known seven layer Open Systems Interconnection (OSI) model, which includes (in ascending order) physical, data link, network, transport, session, presentation and application layers. VMs are enabled to communicate with other network entities as if the VMs were physical network elements through the substitution of a virtual network connection for the conventional physical layer connection.

In current cloud computing environments in which data storage systems and host systems can be widely geographically and/or topologically distributed and the volume of data can be in the petabytes (i.e., a so-called "big data" environment), it is desirable to provide low latency access to frequently accessed data, while still retaining (e.g., archiving) less frequently accessed data. To provide such low latency access to stored data, it is conventional to implement multiple tiers of data storage, with storage devices having smaller storage capacities, higher performance, and higher per-byte cost at the upper tiers and storage devices having larger storage capacities, lower performance, and lower per-byte cost at the lower tiers. Data are then distributed among the tiers based on a "heat" metric providing an indication of the frequency and/or recency of access, with "hotter" data (i.e., more frequently and/or recently accessed data) placed in the upper tiers and "colder" (i.e., less frequently and/or recently accessed data) placed in the lower tiers.

It is common in such cloud computing environments that some extents (i.e., contiguous blocks of storage) are contemporaneously accessed by multiple hosts. For example, in some cases, the contemporaneous access may arise because the extents are mapped to a shared volume that may be subject to read and write access by multiple hosts. In other cases, conventional data deduplication techniques may be employed to maintain only a single copy of deduplicated data for multiple volumes of storage. Thus, even though the individual volumes may not be shared by multiple hosts, deduplicated extents mapped to the volumes may still be subject to contemporaneous access by the multiple hosts.

BRIEF SUMMARY

The present disclosure appreciates that data storage systems employing conventional heat-tiered storage migrate data between tiers without reference to which hosts are responsible for making the various extents hot. Consequently, if a host that is performing frequent I/O is unconfigured or if a logical unit (LUN) including a number of extents is unmapped from the host, the status change of the host or LUN will not affect the heat of the extents in the storage system. As a result, hot extents that were heavily accessed by the unconfigured host or via the unmapped LUN will remain in the upper tiers of the storage system even after the host is unconfigured or LUN is unmapped until the heat of the extents decreases to the point that the extents are migrated to lower tiers of the storage system.

Some conventional heat-tiered storage systems attempt to address this misallocation of the storage capacity of the low latency upper tiers of the storage system by simply reducing the fixed migration interval over which decisions are made regarding data migration. In this approach, data migration is performed at a greater frequency, leading to a significant increase in the cost of heat-tiering in terms of both power consumption and I/O performance.

The present disclosure recognizes, however, that it would be useful and desirable to address the misallocation of upper tier storage capacity by implementing a host-aware heat-tiered storage policy. In at least one embodiment, a data storage system includes multiple tiers of data storage accessible by multiple hosts. The multiple tiers include an upper tier having a lower access latency and a lower tier having a higher access latency. For each extent among a plurality of extents of file system objects in the data storage, the storage controller separately tracks, for each of one or more hosts that access the extent, a respective heat indicative of a frequency of access by that host. In response to an event disassociating a first host among the multiple hosts from a particular extent among the plurality of extents, the storage controller recalculates an overall heat of the particular extent while excluding a first heat of the first host for the particular extent. The storage controller migrates extents among the multiple tiers based on overall heats of the plurality of extents.

DETAILED DESCRIPTION

Figure 1:
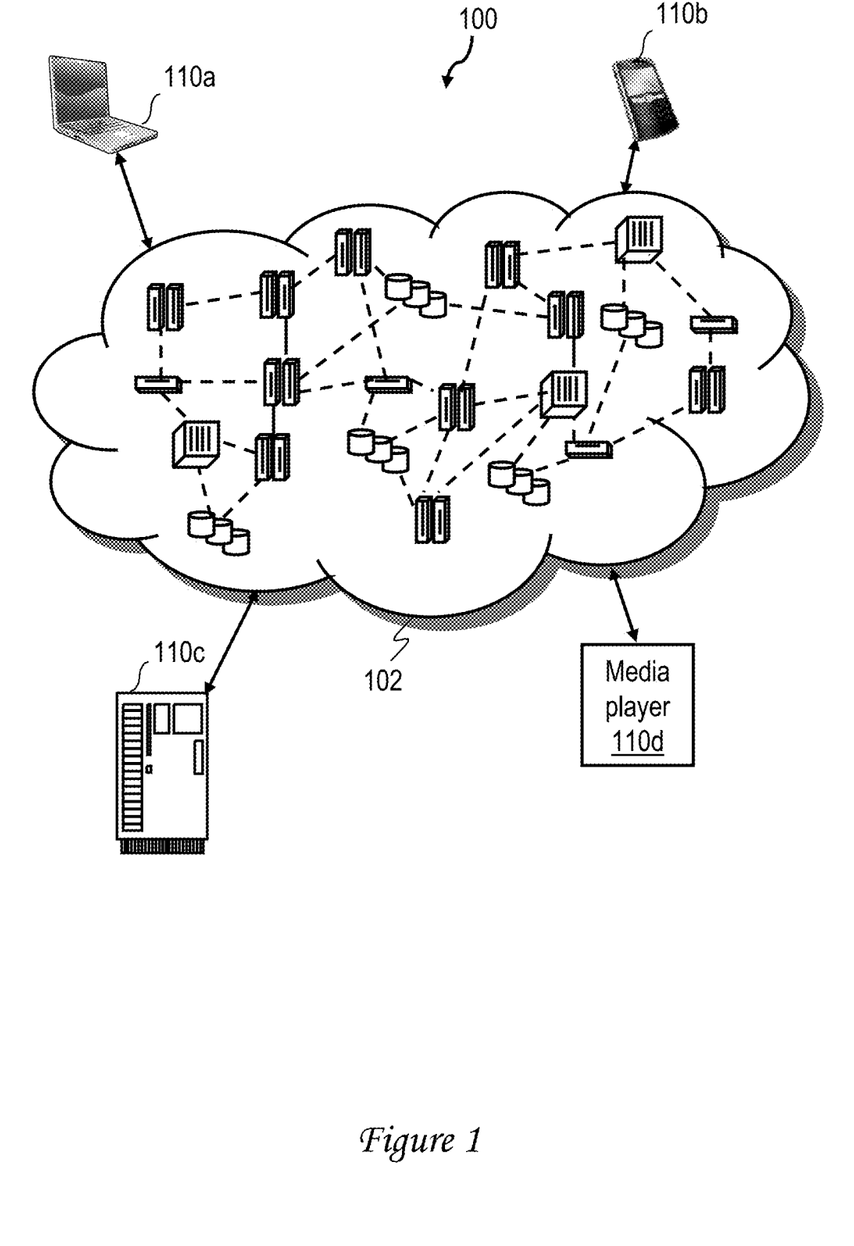
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100, which in the depicted embodiment is a cloud computing environment, includes a collection of computing resources commonly referred to as a cloud 102. Computing and data storage resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms, and/or software as services accessible to host devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of host devices 110 shown in FIG. 1 are illustrative only and that host devices 110 can be any type of electronic device capable of communicating with and accessing services of computing and data resources in collection 110 via a packet network.

Figure 2:
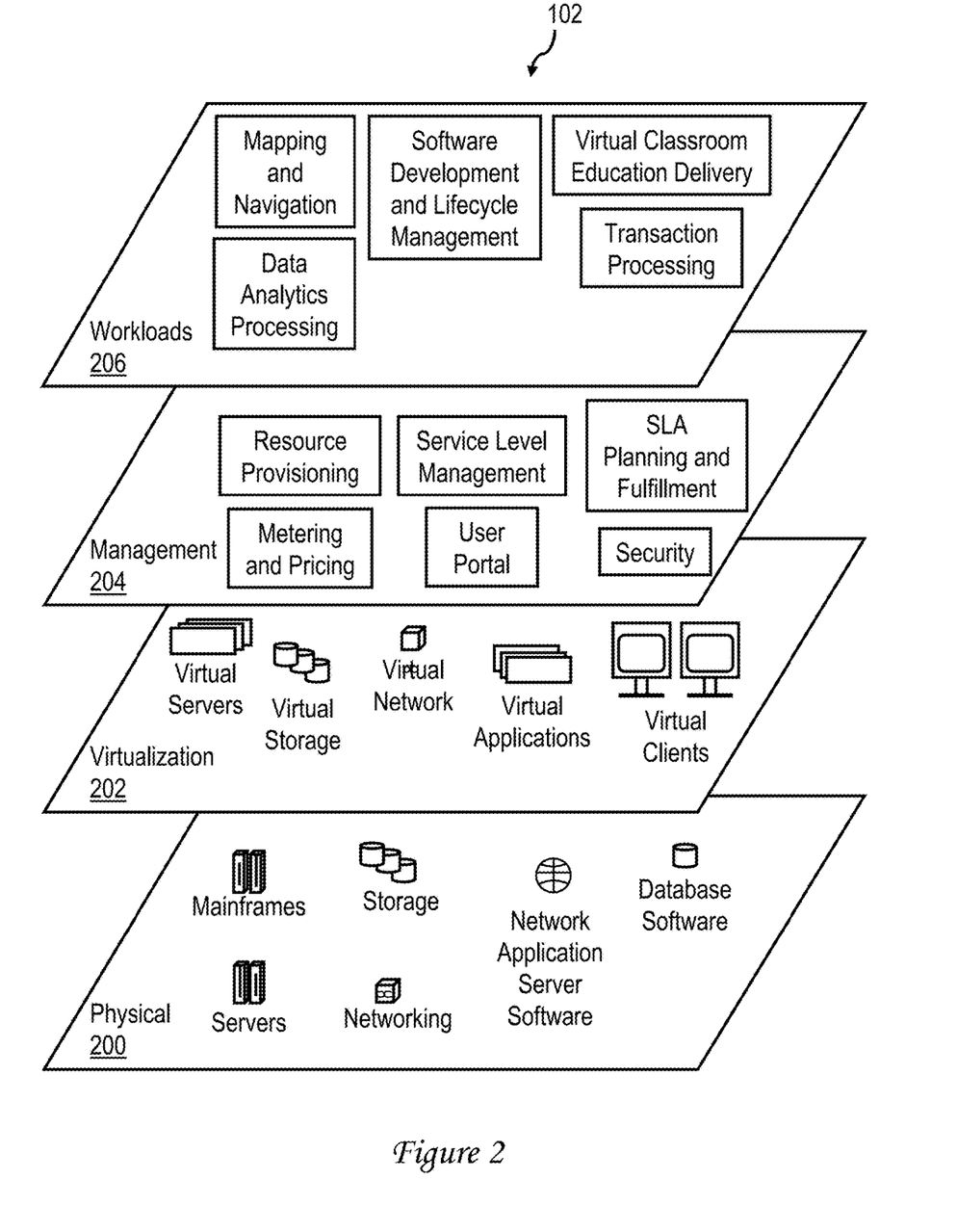
FIG. 2 depicts the layering of virtual and physical resources in the exemplary data processing environment of FIG. 1 in accordance with one embodiment.

FIG. 2 is a layer diagram depicting exemplary virtual and physical resources residing in collection of cloud 102 of FIG. 1 in accordance with one embodiment. It should be understood that the computing and data storage resources, layers, and functions shown in FIG. 2 are intended to be illustrative only and embodiments of the claimed inventions are not limited thereto.

As depicted, cloud 102 includes a physical layer 200, a virtualization layer 202, a management layer 204, and a workloads layer 206. Physical layer 200 includes various physical hardware and software components that can be used to instantiate virtual entities for use by the cloud service provider and its customers. As an example, the hardware components may include mainframes (e.g., IBM® zSeries® systems), servers (e.g., IBM pSeries® systems), data storage systems (e.g., flash drives, magnetic drives, optical drives, tape drives, etc.), physical networks, and networking components (e.g., routers, switches, etc.). The software components may include, for example, operating system software (e.g., Windows, Linux, Android, iOS, etc.), network application server software (e.g., IBM WebSphere® application server software, which includes web server software), and database software.

The computing resources residing in physical layer 200 of cloud 102 are virtualized and managed by one or more virtual machine monitors (VMMs) or hypervisors. The VMMs present a virtualization layer 202 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by host devices 110 of cloud consumers on-demand.

The VMM(s) also support a management layer 204 that implements various management functions for the cloud 102. These management functions can be directly implemented by the VMM(s) and/or one or more management or service VMs running on the VMM(s) and may provide functions such as resource provisioning, metering and pricing, security, user portal services, service level management, and service level agreement (SLA) planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels (i.e., QoS) are met. For example, the security function or service level management function may be configured to limit deployment/migration of a virtual machine (VM) image to geographical location indicated to be acceptable to a cloud consumer. The SLA planning and fulfillment function provides pre-arrangement for, and procurement of, cloud computing resources for which a future requirement is anticipated in accordance with an SLA.

Workloads layer 206, which may be implemented by one or more consumer VMs, provides examples of functionality for which the cloud computing environment may be utilized. Examples of workloads and functions which may be provided from workloads layer 206 include: mapping and navigation; software development and lifecycle management; virtual classroom education delivery; data analytics processing; and transaction processing. Of course, in other environments alternative or additional workloads may be executed.

Figure 3:
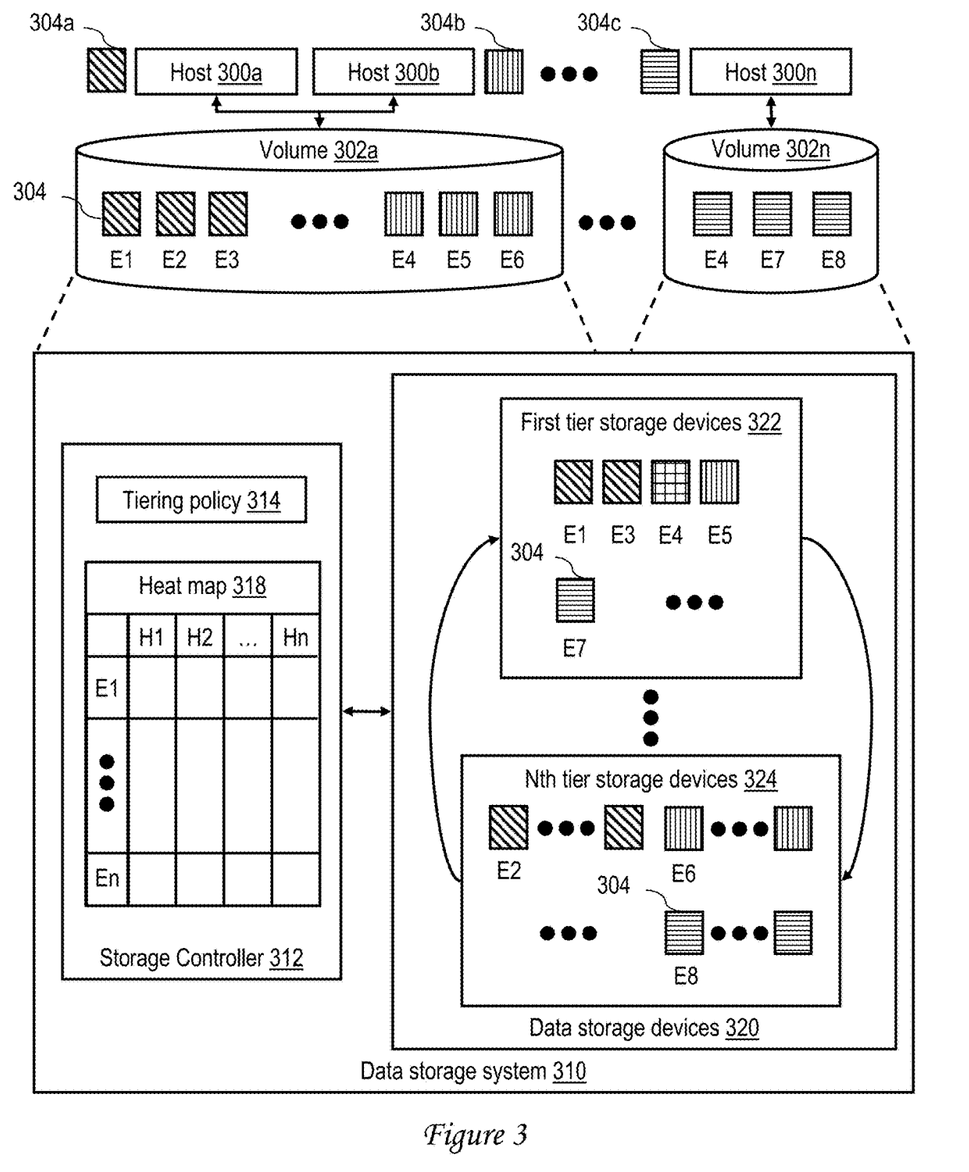
FIG. 3 is a high level block diagram of an exemplary data storage system in the data processing environment of FIG. 1, which, in accordance with a preferred embodiment, implements a host-aware heat-tiering storage policy.

With reference now to FIG. 3, there is illustrated a high level block diagram of an exemplary embodiment of a data storage system 310 within physical layer 200 of cloud 102. As shown, data storage system 310 includes at least one storage controller 312, which is coupled for communication with, and controls operation of, a collection of possibly heterogeneous data storage devices 320. Storage controller 312 may be implemented entirely in hardware or may include a hardware platform (e.g., a processor and associated memory) that executes firmware and/or software. Storage controller 312 manages data storage devices 320 in accordance with a heat-based tiering policy 314, which can be updated from time-to-time, for example, by a storage administrator of data storage system 310.

In accordance with heat-based tiering policy 314, storage controller 312 preferably organizes and manages data storage devices 320 in multiple tiers, which can be formed, for example, based on the access latency, storage capacity, estimated useful lifetime, data storage duration, data priority, and/or other characteristics of stored data and/or the underlying storage media. In one preferred embodiment, the data storage devices 320 forming each of the various tiers of data storage devices 320 have similar access latencies. Thus, for example, first tier storage devices 322 can include one or more data storage devices, such as flash or other non-volatile memory devices, having relatively low access latencies as well as relatively low storage capacities. Data storage devices 320 further include one or more additional lower tiers including Nth tier storage devices 324. These lower storage tier(s), which generally employ storage media such as magnetic disks, tape drives, etc., having lower per-byte costs and higher access latencies than first tier storage devices 322, generally providing greater storage capacities than first tier storage devices 322.

In the environment depicted in FIG. 3 the data stored within data storage system 310 includes a plurality of extents 304, each of which is formed of one or more contiguous blocks of physical storage. The extents 304 within data storage devices 320 are accessed by multiple hosts 300a-300b, which can be virtual or physical platforms that are internal to cloud 102 or external to cloud 102 (e.g., host devices 110a-110d). Extents 304 stored within data storage system 310 are logically presented to client platforms 300 via virtualization layer 202 as a plurality of volumes 302a-302n, which can, in turn, include one or more logical units (LUNs) (not explicitly illustrated in FIG. 3). As indicated by distinct shading, the extents 304 stored within data storage system 310 and referenced via volumes 302 include extents 304a accessed by host 300a, extents 304b accessed by host 300b, and extents 304c accessed by host 304c. At least some extents 304 are shared extents that are accessed either directly or indirectly (via deduplication) by more than one host 300. For example, extent E4 is a shared extent that is accessed by hosts 300b-300c and accordingly is shaded in first tier storage devices 322 to indicate access by both of these hosts.

Storage controller 312 preferably maintains, for each of the plurality of hosts 300, a respective heat attribute for each storage unit that it accesses. In the following description, the storage unit is assumed to be an extent 304, but in other embodiments can be a file or other storage object. The heat attribute indicates a frequency and/or recency of access to the associated storage unit and has a value that is preferably computed by storage controller 312 in accordance with a heat formula specified by tiering policy 314. In one particular example, the heat formula includes a built-in decay (e.g., an exponential decay) so that unaccessed extents 304 become colder as the time elapsed since the most recent access increases.

In various embodiments, the heat attributes of extents 304 can be stored in a distributed or centralized manner. For example, in one embodiment, the heat attributes can be stored as extended attributes of the file system objects containing the extents 304. Alternatively or additionally, the heat attributes can be stored in a separate data structure (e.g., table), referred to herein as a heat map 318, maintained by storage controller 312. In this embodiment, heat map 318 records, for each extent 304 in data storage system 310, a separate heat for each host 300, if any, that accesses that extent 304. Storage controller 312 can easily determine the overall heat of an extent 304 simply by summing the heats of all the hosts 300 for that extent 304. Further details regarding the recording and updating of per-host heats for extents 304 are provided below with reference to FIG. 5.

In general, storage controller 312 maintains the hottest extents 304 (e.g., those most frequently accessed) in first tier storage devices 322, the next hottest extents 304 in a next lower tier of storage devices 320, if any, and the coldest extents 304 in Nth tier storage devices 324. This arrangement can be achieved, for example, by applying various heat thresholds specified by tiering policy 314 to migrate extents 304 among the various tiers 322, . . . , 324 based on their overall heats, subject to the storage capacities of the various storage tiers. As a result of the heat-based tiering policy 314 implemented by storage controller 312, FIG. 3 illustrates that extents E1 and E3 accessed by host 300a, extent E5 accessed by host 300b, extent E7 accessed by host 300n, and extent E4 accessed by hosts 300b-300n are among the extents 304 having the highest overall heats and are therefore stored in first tier storage devices 322. Colder extents 304, including extents E2, E6, and E8, are stored in Nth tier storage devices 324. One embodiment of a process by which storage controller 312 migrates extents 304 between tiers 322, . . . , 324 in accordance with heat-based tiering policy 314 is described further below with reference to FIG. 6.

Figure 5:
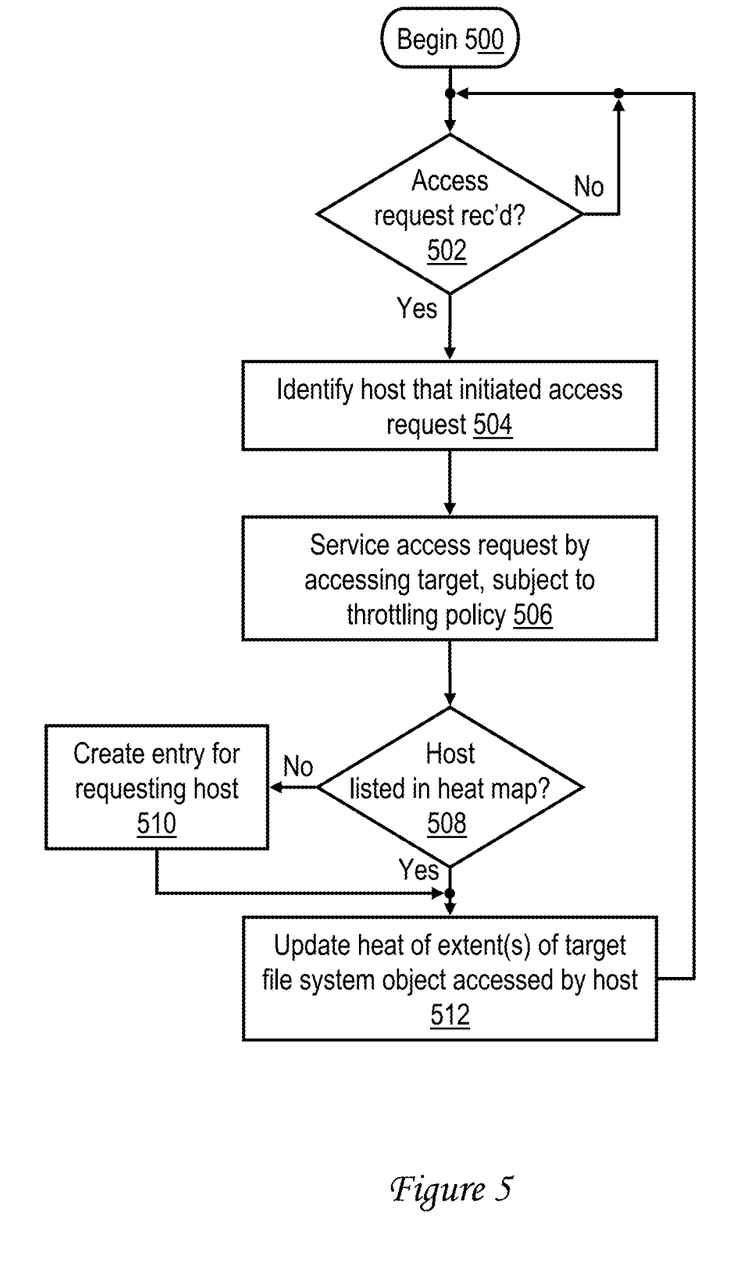
FIG. 5 is a high level logical flowchart of an exemplary process for updating the heat attribute of an extent of a file system object in accordance with one embodiment.

With reference now to FIG. 5, there is illustrated a high level logical flowchart of an exemplary process for updating the heat attribute of an extent of a file system object in accordance with one embodiment. For ease of understanding, the process shown in FIG. 5 (and the additional process given in FIG. 6) will be described with reference to the management of data storage system 310 performed by storage controller 312 in accordance with heat-based tiering policy 314.

The process of FIG. 5 begins at block 500 and thereafter proceeds to block 502, which depicts storage controller 312 awaiting receipt of an access request from a workload executing on a host 300 either within cloud 102 or on an external system, such as a host device 110. The access request, for example, a read, write, or open request, requests the specified type of access to a target file system object including one or more extents 304. In response to receipt of the access request by storage controller 302, the process proceeds to block 504.

Block 504 depicts storage controller 312 identifying the host that initiated the access request. For example, storage controller 312 may identify the host by capturing an identifier (e.g., Internet Protocol (IP), Media Access Control (MAC), or other network address) specified in the access request or in an encapsulating header. At block 506, storage controller 312 additionally services the access request, for example, by opening, reading, and/or writing one or more extents 304 of a target file system object within data storage system 310.

In connection with the access performed at block 506, storage controller 312 also updates (e.g., increases) the heat attribute of the accessed extent(s) 304 of the target file system object to reflect the access, as shown at blocks 508-512. In particular, at block 508 storage controller 312 determines whether or not the requesting host 300 identified at block 504 is presently listed in heat map 318. As will be appreciated, in virtualized environments such as cloud 102, virtual hosts 300 are frequently configured and unconfigured, and volumes 302 and their LUNs are likewise frequently mapped and unmapped. In such environments, it is therefore common for the host 300 making an access request to not be listed in heat map 318 at block 508. If the requesting host 300 is already listed in heat map 318, the process proceeds from block 508 directly to block 512. If, however, storage controller 312 determines at block 508 that the host that initiated the access request is not listed in heat map 318, storage controller 312 creates an entry in heat map 318 corresponding to the requesting host 300 (block 510). The process then passes to block 512.

Block 512 illustrates storage controller 312 updating the host-specific heat of each extent 304 accessed to service the access request. In some embodiments, the update to the heat attribute can be a simple incrementation of an access count of the requesting host 300 for each accessed extent 304. In other embodiments, the update depicted at block 512 may be further based on other factors, such as the type of access (e.g., open, read, write, etc.) and/or the most recent access times to the accessed extent 304. Following block 512, the process of FIG. 5 returns to block 502 and following blocks, which have been described.

Figure 6:
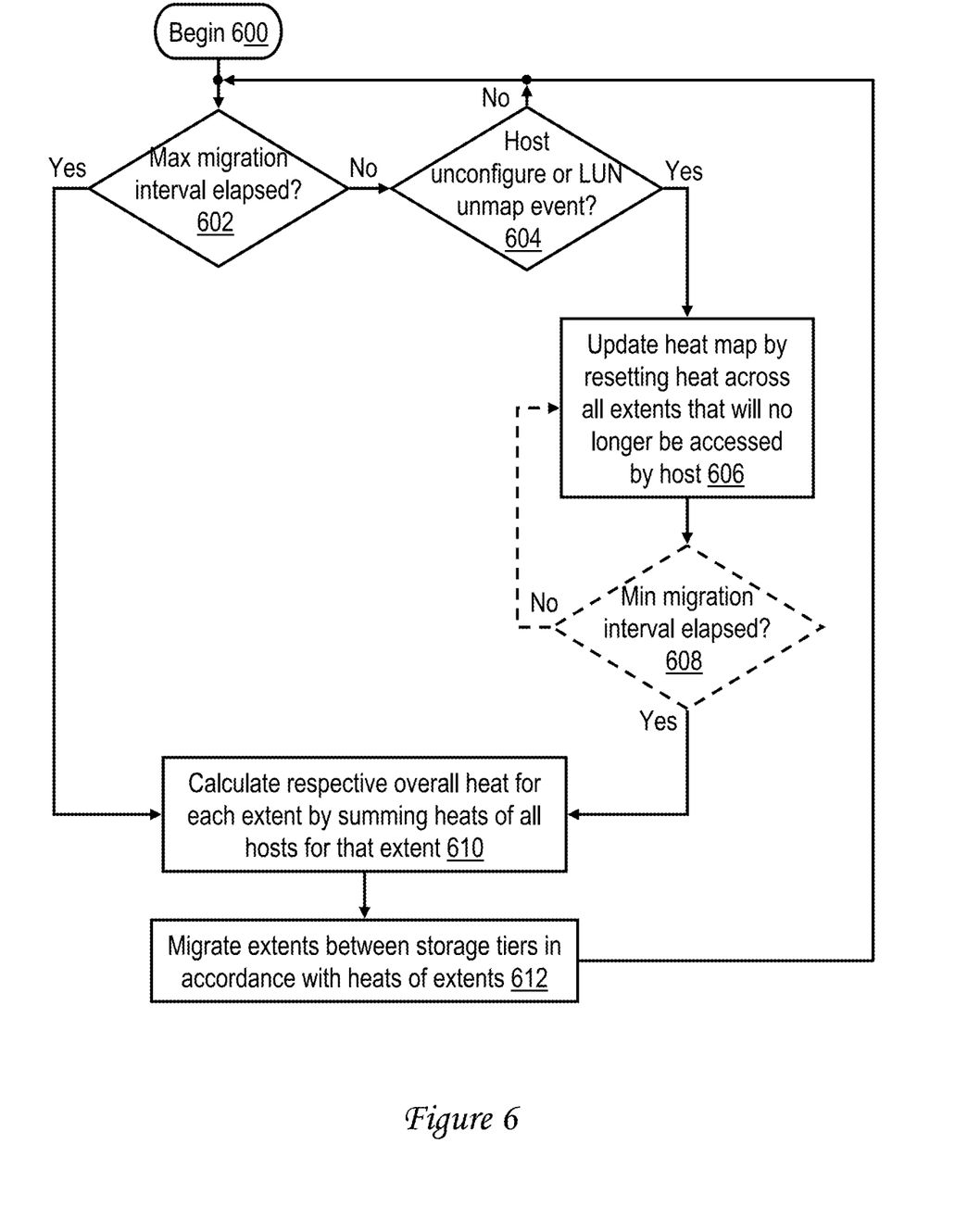
FIG. 6 is a high level logical flowchart of an exemplary process for managing migration of data in a heat-tiered data storage system in accordance with one embodiment.

Referring now to FIG. 6, there is depicted a high level logical flowchart of an exemplary process by which a storage controller, such as storage controller 312, implements heat-based management of a tiered data storage system in accordance with one embodiment. The process given in FIG. 6, while implementing heat-based tiering, exhibits awareness of host-related events and therefore provides improved allocation of the capacity of the upper tiers of data storage system 310.

The illustrated process begins at block 600 and thereafter proceeds to block 602, which illustrates storage controller 312 determining whether or not a maximum migration interval has elapsed. The maximum migration interval, which specifies a maximum interval between migration events, can be set, for example, by a storage administrator and can have a duration, for example, of 12 hours, 1 day, or 2 days. If storage controller 312 determines at block 602 that the maximum migration interval has elapsed since it last performed heat-based migration of extents 304 between the tiers 322, . . . , 324 of data storage system 310, the process proceeds from block 602 to block 610, which is described below. If, however, storage controller 312 determines at block 602 that the maximum migration interval has not elapsed, storage controller 312 also determines at block 604 whether or not it has received notification of a host-related event, such as a host unconfigure event in which one of hosts 300 is unconfigured or a LUN unmap event in which one or more of the LUNs of volumes 302 are unmapped from a host 300. If not, the process returns to block 602, which has been described. If, however, storage controller 312 determines at block 604 that notification of a host-related event has been received, the process proceeds from block 604 to block 606.

Block 606 illustrates storage controller 312 updating heat map 318 in response to the notification of the host-related event. In one embodiment, storage controller 312 resets all heat attributes of a host 300 for any extents 304 from which that host 300 has been disassociated by the host-related unconfigure or unmap event detected at block 604. As a result, the overall heats of such extent(s) 304 will be diminished by the contribution formerly made by the disassociated host 300. In some embodiments, the process passes directly from block 606 to block 610, indicating that storage controller 312 performs a heat-based migration of extents 304 between tiers 322, . . . , 324 of data storage system 310 upon receipt of notification of any host-related event disassociating a host 300 from an extent 304 of data storage system 310. In other embodiments, storage controller 312 optionally enforces a minimum migration interval (e.g., 4 hours, 8 hours, etc.) between performing extent migration, as indicated at block 608. Following block 608, if implemented, the process passes to block 610.

Block 610 illustrates storage controller 312 calculating a respective overall heat for each extent 304 in data storage system 310. As noted above, storage controller 312 can calculate the overall heat for each extent 304 by simply summing the individual heats for that extent 304 for each host 300 recorded in heat map 318. Because this calculation is performed following the update to the heat map made at block 606, the overall heats calculated at block 610 will reflect only the heat contributions of the hosts 300 that remain associated with the extents 304 and will exclude any heat contribution from hosts 300 no longer associated with the extents 304.

Based on the calculations performed at block 610, storage controller 312 performs a heat-based migration of extents 304 between storage tiers 322, . . . , 324 in accordance with their respective overall heats (block 612). For example, assuming a heat attribute range of 0 . . . 100, where 0 corresponds to a minimum access frequency and 100 corresponds to a maximum access frequency, storage controller 312 may perform the necessary migrations of extents 304 to place extents 304 having a heat greater than 80 in first tier storage devices 322, extents 304 having a heat of 31 to 80 in a second tier of storage devices (not illustrated), and extents 304 having a heat of 30 or less in Nth tier storage devices 324. As indicated by arrows in FIGS. 3-4, this migration may entail storage controller 312 migrating various extents 304 upward or downward between storage tiers to achieve the desired heat-based distribution determined by tiering policy 314.

Figure 4:
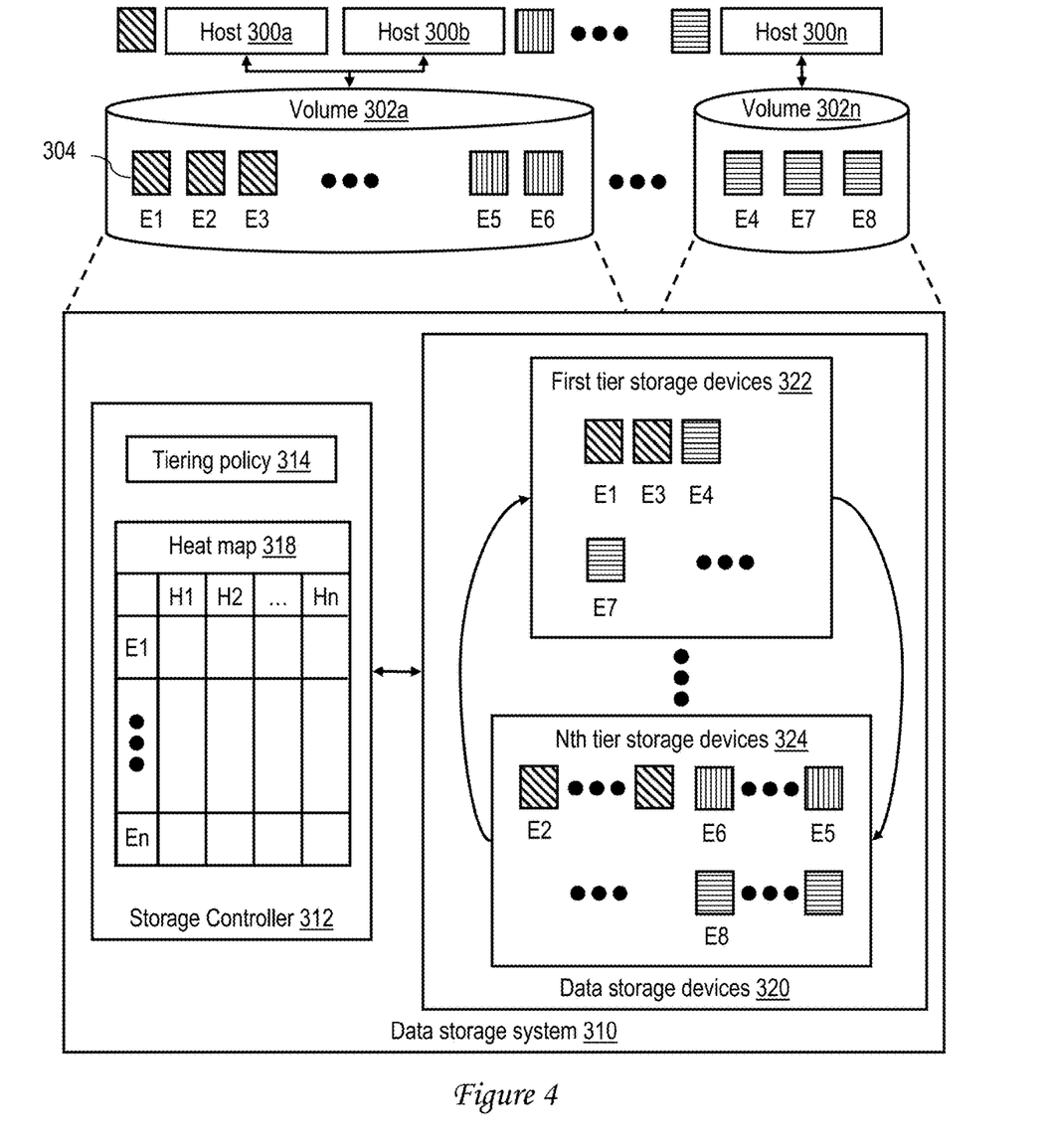
FIG. 4 is another high level block diagram of the data storage system of FIG. 3, which depicts that the host-aware heat-tiering storage policy migrates extents of unconfigured hosts and unmapped LUNs to lower tiers of the data storage system while enabling hot shared extents to be maintained in the upper tier(s) of the data storage system.

In the exemplary operating scenario given in FIGS. 3-4, the migration performed at block 612 includes demoting extents 304 in first tier storage devices 322 that have cooled to Nth tier storage devices 324. In this example, these demoted extents 304 include extent E5. It should be noted that in some cases, some shared extents 304 can be retained in first tier storage devices 322 despite the disassociation of one or more hosts 300 from that extent. For example, FIG. 4 explicitly illustrates that extent E4, which is disassociated from host 300b by the unmapping of the LUN of volume 302a including extent E4, is nevertheless retained in first tier storage devices 322 based on the heat contribution of host 300n.

As has been described, in at least one embodiment, a data storage system includes multiple tiers of data storage accessible by multiple hosts. The multiple tiers include an upper tier having a lower access latency and a lower tier having a higher access latency. For each extent among a plurality of extents of file system objects in the data storage, the storage controller separately tracks, for each of one or more hosts that access the extent, a respective heat indicative of a frequency of access by that host. In response to an event disassociating a first host among the multiple hosts from a particular extent among the plurality of extents, the storage controller recalculates an overall heat of the particular extent while excluding a first heat of the first host for the particular extent. The storage controller migrates extents among the multiple tiers based on overall heats of the plurality of extents.

The disclosed data storage system provides host- and LUN-aware heat-based tiering to improve storage utilization based on observed host I/O. The disclosed heat-based tiering is able to react more quickly to heat changes for an extent by compensating rapidly for the disassociation from the extent of a virtual or physical host that was responsible for the heat of the extent. By responding rapidly to migrate formerly hot extents downward in the storage hierarchy, storage capacity of upper tiers of storage is freed more quickly, enabling rapid promotion of hot extents upward through the storage tiers. As a result of better utilization of the storage capacity of the upper tiers of the data storage system, system response time are improved without requiring additional storage capacity in the upper (i.e., lower latency) storage tiers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of controlling a data storage system having multiple tiers of data storage accessible by multiple hosts including at least first and second hosts, wherein the multiple tiers include an upper tier having a lower access latency and a lower tier having a higher access latency, said method comprising:

for each extent of one or more physical blocks among a plurality of extents of file system objects in the data storage system, a storage controller separately tracking, for each of one or more hosts that access the extent, a respective heat indicative of a frequency of access by that host, wherein the separately tracking includes tracking, for the first host, a first heat for a particular extent among the plurality of extents based on one or more accesses to the particular extent by the first host and concurrently tracking, for the second host, a second heat for the particular extent based on one or more accesses to the particular extent by the second host;

the storage controller calculating an overall heat by accessing and combining the first and second heats;

thereafter, based on occurrence of an event disassociating the first host from the particular extent while retaining the particular extent in the upper tier following the event, wherein the event is one of a host unconfigure event and a logical unit (LUN) unmap event, the storage controller recalculating an overall heat of the particular extent, wherein the recalculating includes excluding from recalculation of the overall heat the first heat of the first host and including in the recalculation of the overall heat the second heat of the second host; and the storage controller migrating extents among the multiple tiers based on overall heats of the plurality of extents.

2. The method of claim 1, wherein the migrating comprises migrating in response to the event disassociating the first host from the particular extent.

3. The method of claim 2, wherein the storage controller performs the migrating subject to a minimum migration interval.

4. The method of claim 1, wherein the tracking comprises tracking the respective heats in a unified heat map data structure in the data storage system.

5. A data storage system, comprising:

a storage controller for data storage devices, the data storage devices including an upper tier having a lower access latency and a lower tier having a higher access latency, wherein the data storage devices are configured to be accessible by multiple hosts including at least first and second hosts and the storage controller is configured for performing:

for each extent of one or more physical blocks among a plurality of extents of file system objects in the data storage devices, separately tracking, for each of one or more hosts that access the extent, a respective heat indicative of a frequency of access by that host, wherein the separately tracking includes tracking, for the first host, a first heat for a particular extent among the plurality of extents based on one or more accesses to the particular extent by the first host and concurrently tracking, for the second host, a second heat for the particular extent based on one or more accesses to the particular extent by the second host;

calculating an overall heat by accessing and combining the first and second heats;

thereafter, based on occurrence of an event disassociating the first host from the particular extent while retaining the particular extent in the upper tier following the event, wherein the event is one of a host unconfigure event and a logical unit (LUN) unmap event, recalculating an overall heat of the particular extent, wherein the recalculating includes excluding from recalculation of the overall heat the first heat of the first host and including in the recalculation of the overall heat the second heat of the second host; and migrating extents among the multiple tiers based on overall heats of the plurality of extents.

6. The data storage system of claim 5, wherein the migrating comprises migrating in response to the event disassociating the first host from the particular extent.

7. The data storage system of claim 6, wherein the storage controller performs the migrating subject to a minimum migration interval.

8. The data storage system of claim 5, wherein the tracking comprises tracking the respective heats in a unified heat map data structure in the data storage system.

9. The data storage system of claim 5, and further comprising the data storage devices.

10. A computer program product, the computer program product comprising a computer readable storage medium having program instructions embodied therewith, the program instructions executable by a storage controller of a data storage system configured to be accessible by multiple hosts including at least first and second hosts, wherein the storage system includes an upper tier having a lower access latency and a lower tier having a higher access latency and the instructions cause the storage controller to perform:

for each extent of one or more physical blocks among a plurality of extents of file system objects in the data storage, system separately tracking, for each of one or more hosts that access the extent, a respective heat indicative of a frequency of access by that host, wherein the separately tracking includes tracking, for the first host, a first heat for a particular extent among the plurality of extents based on one or more accesses to the particular extent by the first host and concurrently tracking, for the second host, a second heat for the particular extent based on one or more accesses to the particular extent by the second host;

calculating an overall heat by accessing and combining the first and second heats;

thereafter, based on occurrence of an event disassociating the first host from the particular extent while retaining the particular extent in the upper tier following the event, wherein the event is one of a host unconfigure event and a logical unit (LUN) unmap event, recalculating an overall heat of the particular extent, wherein the recalculating includes excluding from recalculation of the overall heat the first heat of the first host and including in the recalculation of the overall heat the second heat of the second host; and migrating extents among the multiple tiers based on overall heats of the plurality of extents.

11. The computer program product of claim 10, wherein the migrating comprises migrating in response to the event disassociating the first host from the particular extent.

12. The computer program product of claim 11, wherein the storage controller performs the migrating subject to a minimum migration interval.

13. The computer program product of claim 10, wherein the tracking comprises tracking the respective heats in a unified heat map data structure in the data storage system.

* * * * *